(12) United States Patent
Ramsey

(10) Patent No.: US 11,297,814 B2
(45) Date of Patent: Apr. 12, 2022

(54) RECIRCULATING BAITFISH BUCKET

(71) Applicant: Jason Ramsey, Buckeye, AZ (US)

(72) Inventor: Jason Ramsey, Buckeye, AZ (US)

(*) Notice: Subject to any disclaimer, the term of this patent is extended or adjusted under 35 U.S.C. 154(b) by 26 days.

(21) Appl. No.: 16/912,984

(22) Filed: Jun. 26, 2020

(65) Prior Publication Data
US 2021/0120798 A1 Apr. 29, 2021

Related U.S. Application Data

(60) Provisional application No. 62/927,164, filed on Oct. 29, 2019.

(51) Int. Cl.
| | | |
|---|---|---|
| *A01K 97/05* | (2006.01) | |
| *A01K 63/04* | (2006.01) | |
| *A01K 63/02* | (2006.01) | |
| *B32B 1/02* | (2006.01) | |
| *B32B 3/26* | (2006.01) | |
| *B32B 9/02* | (2006.01) | |
| *B32B 9/06* | (2006.01) | |
| *B65B 11/00* | (2006.01) | |
| *B65D 65/10* | (2006.01) | |
| *B65D 65/40* | (2006.01) | |
| *B65D 65/46* | (2006.01) | |
| *B65D 83/08* | (2006.01) | |

(52) U.S. Cl.
CPC ............. *A01K 97/05* (2013.01); *A01K 63/02* (2013.01); *A01K 63/047* (2013.01); *B32B 1/02* (2013.01); *B32B 3/266* (2013.01); *B32B 9/02* (2013.01); *B32B 9/06* (2013.01); *B65B 11/004* (2013.01); *B65D 65/10* (2013.01); *B65D 65/40* (2013.01); *B65D 65/466* (2013.01); *B65D 83/0882* (2013.01); *B32B 2307/7163* (2013.01); *B32B 2307/726* (2013.01); *B32B 2307/7265* (2013.01); *B32B 2439/62* (2013.01); *B32B 2439/70* (2013.01)

(58) Field of Classification Search
CPC ......... A01K 97/05; A01K 63/02; A01K 97/20
See application file for complete search history.

(56) References Cited

U.S. PATENT DOCUMENTS

| | | | | |
|---|---|---|---|---|
| 5,799,435 | A  * | 9/1998 | Stafford | A01K 97/05 43/57 |
| 8,806,803 | B1 * | 8/2014 | Mitchell | A01K 97/06 43/54.1 |
| 2009/0064565 | A1* | 3/2009 | Sloop | A01K 97/05 43/57 |
| 2014/0023767 | A1* | 1/2014 | Dikas | B01F 3/04 |
| 2016/0081319 | A1* | 3/2016 | Myers | A01K 97/05 |
| 2016/0120163 | A1* | 5/2016 | Arden | A01K 97/05 |

* cited by examiner

*Primary Examiner* — Joshua J Michener
*Assistant Examiner* — Henry Hooper Mudd
(74) *Attorney, Agent, or Firm* — Brennan, Manna & Diamond, LLC (57) ABSTRACT

The present invention relates generally to a new and improved fishing bait bucket or container. More specifically, this invention relates to a bait bucket that has a generally cylindrical insulated main body, a suction hose assembly, a water pump, an overflow hose assembly, a main lid, and a secondary lid. This invention allows for the continuous passive cycling of water through the bait bucket to optimize the conditions therein and the lifespan of the baitfish.

19 Claims, 5 Drawing Sheets

RECIRCULATING BAITFISH BUCKET

CROSS-REFERENCE TO RELATED APPLICATION

The present application claims priority to and the benefit of U.S. Provisional Application No. 62/927,167 filed on Oct. 29, 2019, which is incorporated herein by reference in its entirety.

BACKGROUND

The present invention relates generally to a new and improved fishing bait bucket. More specifically, this invention relates to a generally circular, elliptical or oval bait bucket that is comprised of a generally shaped insulated main body, that is co-extensive with the shape of the bait bucket, a suction hose assembly, a water or fluid circulation pump, an overflow hose assembly, a main lid, and a secondary lid. The shape of the bucket preferably should avoid any corners. This invention allows for the continuous passive cycling of water or other fluid through the bait bucket to optimize the conditions and lifespan of baitfish. Accordingly, the present specification makes specific reference to the presently described invention. However, it is to be appreciated that aspects of the present invention are also equally amenable to other like applications, devices and methods of manufacture.

In the sport/hobby of fishing, it may be desirable to use live bait in certain fishing scenarios which involve sportfish species that prey upon smaller baitfish, with the species of baitfish including for example threadfin shad or other shad species. Baitfish examples may include a variety of other fish such as anchovies, gudgeon, halfbeaks such as ballyhoo, and scad. Some larger species of fish such as menhaden, flying fish, or ladyfish may be considered bait fish depending on the size of the gamefish being pursued. Freshwater bait fish include any fish of the minnow or carp family, sucker family, top minnows, shad family, sculpin and sunfish, excluding black basses and crappies. The size of the bucket of the present invention can be configured to address any particular size of the bait fish sought for the fishing expedition.

In order to use shad or other smaller fish as live bait, they must first be kept alive long enough to be used, typically, twenty-four hours or longer. Currently, this is done by simply placing the fish in a plastic bait bucket, bag or container and taking the bucket onto a boat/fishing vessel or to a fishing area to be used. However, keeping bait fish alive is a process with several important factors/conditions that cannot be readily or easily achieved by using existing bait buckets.

Firstly, bait fish are greatly affected in several ways by the conditions of the water they are kept in. In a closed system such as a bait bucket, there exists only a limited supply of dissolved oxygen in the water contained within the bucket. Once this supply of dissolved oxygen has been consumed by the bait fish, death of the baitfish can occur (which can also be a result of overcrowding of the bait fish in the container). Similarly, water temperature can also negatively affect the lifespan of bait fish. Fish are cold blooded animals, which means their metabolism is greatly affected by water temperature as are many of their other biological functions. Generally speaking, the higher the water temperature in a bait bucket, or the larger the number of fish in the container, the faster the fish kept in the bucket will die due to the lower dissolved oxygen content that is inherently present in warmer water. Therefore, it is desirable to keep the water temperature at or around ambient temperature to maximize the lifespan of bait fish. In addition, other nutrient solutions may be added to the water in order to maintain the condition of the bait fish until needed for fishing.

Bait fish will also continue to produce organic waste such as urine while contained in a bait bucket or container. If left unattended, this organic waste can produce ammonia which can be toxic to bait fish if present in a high enough concentration (magnified of course by the number of fish in the container or bucket). In addition, any debris or organic matter inside of the bait bucket will also consume the limited oxygen supply in the water as it decomposes, which will in turn reduce the amount of dissolved oxygen for the bait fish and can result in the premature death of the baitfish. Furthermore, baitfish are also affected by the lack of a water current or other water or fluid movement inside a bait bucket or container that would otherwise be present in the body of water in which they reside and would increase the amount of dissolved oxygen in the water. A lack of water current in a bait bucket can also allow bait fish like shad to swim into the walls of the bait bucket (which they are known to do) if the bucket is also not round, which can damage the shad or result in the death of the shad.

As a result of the various water conditions/factors required to produce an optimal lifespan for bait fish in a bait bucket, it is commonplace to simply replace a portion of the water in a bait bucket every half an hour to an hour to ensure the dissolved oxygen content of the water is adequate. However, it is in this instance where the limitations of existing bait buckets or containers become fully apparent. Typically, this manual water exchange process is done using a small bucket/container to collect the old water from the bait bucket and empty the water into the nearby body of water, but when this occurs the inadvertent collection of a portion of the bait fish within the collection bucket can also occur. As a result, baitfish may be accidently removed with the old water, or a user must place the collection bucket back into the bait bucket and continue to attempt to remove and replace old water without disturbing/removing the baitfish. In addition, this manual water exchange process can be time consuming, messy and can be easily forgotten about by a user. In an instance where this process is indeed forgotten, the result would surely be the death of all bait fish, due to the lack of oxygen which would lead to an unenjoyable fishing experience due to the unavailability of bait fish.

Therefore, there exists a long felt need in the art for an improved bait bucket that can help prevent and thereby decrease the likelihood of bait fish death or decrease the baitfish lifespan. There also exists a need for an improved bait bucket or container that helps prevent and seeks to decrease the likelihood of bait fish death or subject the bait fish to a decreased lifespan through an innovative means of controlling the water conditions of the bait bucket or container. Finally, there also exists in the art a need in the industry for a bait bucket or container that makes the task of preventing the likelihood of bait fish death a mostly completely passive and uninvolved task.

The present invention in one exemplary embodiment, discloses an improved bait bucket. The device is comprised of a generally cylindrical molded and insulated main body, a side-mounted water pump, a suction hose, an overflow hose, a main lid, a secondary lid, and a power supply. This device then creates a closed system that passively integrates and circulates water from a body of water, which may be a steam, lake, or tub of water into the bucket to create a slow circular water current and optimal water conditions such as oxygen levels and temperature for baitfish. In addition, the present invention may also include a thermometer by which the user can monitor the temperature of the water in the bucket or container.

In this manner, the improved bait bucket or container of the present invention accomplishes all of the forgoing objectives, thereby creating a bait bucket or container that helps to prevent and works to decrease the likelihood of bait fish death and the resulting decrease in baitfish lifespan. Put another way, the presently described invention helps the user to increase the survival rate of bait fish while being held in captivity in advance of being needed for fishing. The improved bait bucket or container also helps to prevent and works to decrease the likelihood of bait fish death and the resulting decrease in baitfish lifespan via controlling the water conditions of the bait bucket, specifically relating to the water temperature and oxygen/dissolved oxygen levels present in the water. Finally, the improved bait bucket prevents the likelihood of bait fish death by creating a substantially, completely passive and uninvolved closed system.

SUMMARY

The following presents a simplified summary in order to provide a basic understanding of some aspects of the disclosed innovation. This summary is not an extensive overview, and it is not intended to identify key, critical elements or to in any way delineate the scope thereof. Its sole purpose is to present some concepts in a simplified form as a prelude to the more detailed description that is presented later.

The subject matter disclosed and claimed herein, in one embodiment thereof, comprises discloses an improved bait bucket or container. More specifically, the device is comprised of a molded or otherwise formed and insulated generally cylindrical, circular or other shape, e.g. oval, elliptical, etc., main body, a side-mounted water pump, a suction hose, an overflow hose, a main lid, a secondary lid, and a power supply. This device then creates a substantially completely passive and closed system that requires no additional user input to maintain other than the actuation of the pump and any other initial set up.

The device first utilizes the suction hose which is powered via the pump to transfer water from the lake, stream, tub or other body of water a user may be intending to fish from or with respect to other supplies of water, just using to replenish the water in the bucket into the generally cylindrical main body of the device, which is generally preferred to be of molded and insulated plastic composition. The suction hose may additionally comprise a weighted end cap or other weight disposed adjacent or near the end that ensures the suction hose stays submerged underwater (and thereby continues to suction water into the body of the device) continuously. The weight should ideally keep the end of the hose spaced from the bottom of the bucket or container so as to not allow the suction of the hose to grip the bottom and prevent water circulation. In addition, the end of the hose may include a screen or filter to prevent the hose from becoming clogged with debris. The pump of the device is also comprised of an inlet that facilitates a circular water current via its unique shape which will be described more fully below. In addition, the pump is also comprised of a level or dial actuated closing mechanism that enables a user to close or open access to the suction hose for traveling or usage purposes. The device is also comprised of an overflow hose assembly that is attached to the main body of the device. The overflow hose is further comprised of a screw-on or other snap fitting cap that includes nylon or stainless steel mesh screen, which allows water to exit the device, but prevents baitfish or other debris from doing so.

The lid mechanism of the device includes a main circular lid member that has a gasket and semi-circular secondary lid member. The lid is further secured to the main body via a plurality of latches, clips, or other fasteners, and the secondary lid is also secured via a singular latch, clip or other fastener. The secondary lid allows a user to access at least a portion of the contents (e.g. baitfish) of the device, without having to fully remove the main lid. In addition, the sides of the device are comprised of a plurality of integrated or molded handles, as well as a 12 v power supply that may include a cigarette lighter plug or other adaptor for an electrical outlet in a car, boat, motorhome, trailer, pick-up, ATV or other vehicle.

In one exemplary embodiment, of the presently described invention, a bait bucket, is described and includes a container for holding a fluid and bait. The container has a lid and the lid has a main lid and a secondary portion movable perpendicularly to the main lid. A pump is provided and secured in a housing adjacent the container. The bucket also includes a suction hose that extends into the container and is connected to the pump for drawing a fluid into the container. The bucket further includes an outlet hose for drawing fluid from the container.

In a still further embodiment of the presently described invention, a bait bucket, is presented and includes a body having at least a partially cylindrical shape, the body has a perpendicularly extending lid portion. A pump that is powered by a 12 v power source separate from the body and the pump and the pump includes a battery. A suction hose and an outlet hose is provided and the suction hose is connected to the pump and the outlet hose is connected to the body. A main lid is connected by a hinge to the perpendicularly extending lid portion and the main lid includes a closure element to secure the main lid to the body.

A still further exemplary embodiment of the presently described invention, includes a bait bucket that has an insulated cylindrical body with at least one handle integrated with the body. A pump is included and is powered by a 12 v power source and the pump is connectable to a power source via an adaptor. A suction hose is connected to the pump to draw fluid into the body and an outlet hose that allows water to be discharged from the cylindrical body. A circular main lid is secured to the main body of the body via a one of latches, clamps or fasteners. A semi-circular secondary lid that is attached to the main lid via a hinge and the secondary lid being perpendicularly extendable from the main lid.

The bait bucket of the present invention is primarily described herein as a portable device that may be easily transported and used by a person fishing on a boat, a pier or from shore. Nonetheless, it is also contemplated that the bait bucket of the present invention could be built into a boat or other sea going vessel similar to the manner in which a live well is integrally formed into, for example, a bass boat.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

As noted above, there exists a need in the art for an improved bait bucket or container that helps prevent the premature demise and thus decreases the likelihood of bait fish death or a decrease in baitfish lifespan. There also exists a need for an improved bait bucket or container that helps to prevent and decreases the likelihood of bait fish premature death or a decrease in baitfish lifespan via controlling the water conditions of the bait bucket through use of water or fluid circulation. Finally, there also exists in the art a need for a bait bucket or container that makes the task of helping to prevent the likelihood of premature bait fish death a substantially completely passive and uninvolved task after the initial set up of the device.

Figure 1:
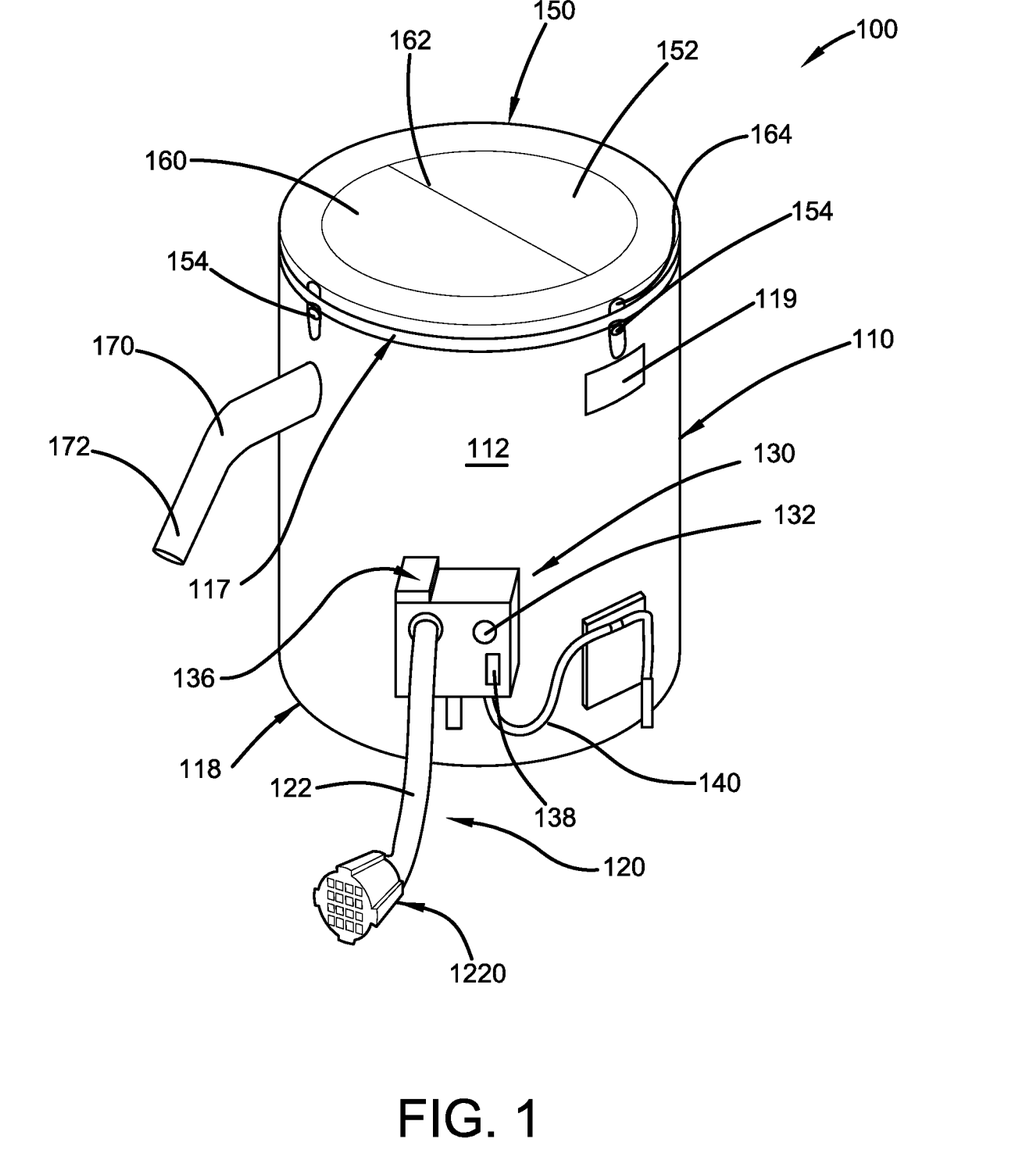
FIG. 1 illustrates a perspective view of one embodiment of the improved bait bucket of the present in accordance with the disclosed structure.

Referring initially to the drawings, FIG. 1 illustrates a perspective view of one embodiment of the improved bait bucket 100 of the present invention. The device 100 is further comprised of a main body 110, a suction hose assembly 120, a water pump 130, an overflow hose assembly 170, a main lid 150, and a secondary lid 160 which is connected to the main lid 150 by a hinge or other means to allow opening of the secondary lid. The main lid has a dimension that is larger than the secondary lid. The main body 110 of the device 100 is preferably and generally cylindrical in shape, in part to ensure that bait fish are unable to swim into any corners of the body 110 and injure themselves. Other shapes may be used to achieve a similar objective such as circular, ovals and ellipses that do not have defined corners. The main body 110 is also preferably comprised of a rigid and molded plastic material that may also include of one or more handles 119. The bucket or container may also be formed from metal, e.g. stainless steel, aluminum or other materials which generally do not rust or corrode. The handles 119 may be attached to or integral with the exterior surface 112 of the main body 110, or may be preferably molded or integrated into the construction of the main body 110. The handles 119 allow for easy transport or maneuvering of the device while on or in a fishing vessel, especially if the device 100 is full of water and therefore extremely heavy.

The main body 110 is also comprised of a housing 132 for the water pump 130 that is preferably comprised of the same plastic material as the entirety of the main body 110. Other materials may of course be used. The housing 132 and pump 130 are also preferably located near the bottom surface 118 of the main body. Water from a body of water (e.g. a lake, stream, tub, etc.) is drawn through the suction hose assembly 120 via the pump 130 which then suctions the water into the main body 110 of the device via an inlet 134 which will be explained more fully below. Pump 130 is preferably an inline cartridge style pump hidden behind a pump cover, but may also be self-priming or other suitable type of pump. The pump 130 is further comprised of a dial or mechanism 136 (e.g., a quarter turn ball valve also preferably hidden behind the pump cover) that allows the user to open and close the suction hose assembly 120 to fill the bucket, and separate the flow of water from the assembly 120 to the main body 110 of the device 100. This allows a user to ensure water does not leak or exit the main body 110 during transport. It may also be used to reduce the current of the water within the bucket while in operation for smaller sized baldish if necessary.

In differing embodiments of the device 100, the mechanism 136 may include a level or gate that functions to close off or limit the flow from the suction hose assembly 120. The pump 130 has a power switch 138 that directs power to the pump via a power supply cord 140 that is in electrical communication with a cigarette lighter plug or other electrical adaptor 142. The plug 142 can be plugged or inserted into any power source (e.g. such as the cigarette lighter or electrical outlet in a vehicle) to charge the rechargeable battery (not shown) of the pump 130. Accordingly, the power supply cord 140 may be comprised of two different types of electrical connectors, such as a cigarette lighter connector and a "direct to battery" connector that is connected in a male to female fashion with the battery. It is further contemplated that the battery will allow for the device 100 and pump 130 to be powered for several hours at a time and permits continuous use of the device 100 and pump 130.

The main lid 150 of the device 100 is generally circular in shape, or will follow a similar shape if other shapes are used, e.g. circular, oval or ellipse, and is preferably comprised of a plastic material such as with the main body 110 of the device 100. The top surface 152 of the main lid is preferably also comprised of a series of indentations which allows the latch, clasp or fastener mechanism 164 to fully secure the main lid 150 to the main body 110. The latch, clasp or fastener system is permanently affixed to the sides of the main body 110 of the device 100 and allows a user to fully secure the lid 150 for travel or usage. In addition, the main lid 150 preferably includes one or more gaskets (not shown) that ensures a water-tight seal with the main body 110 and prevents the contents of the device 100 from spilling. The main lid 150 includes a secondary lid 160 which will be explained more fully below when discussing FIG. 2. The secondary lid 160 is further attached to the main lid 150 via a hinge 162 that allows the secondary lid 160 to travel to a perpendicular position to the top surface 152 of the main lid 150.

Figure 2:
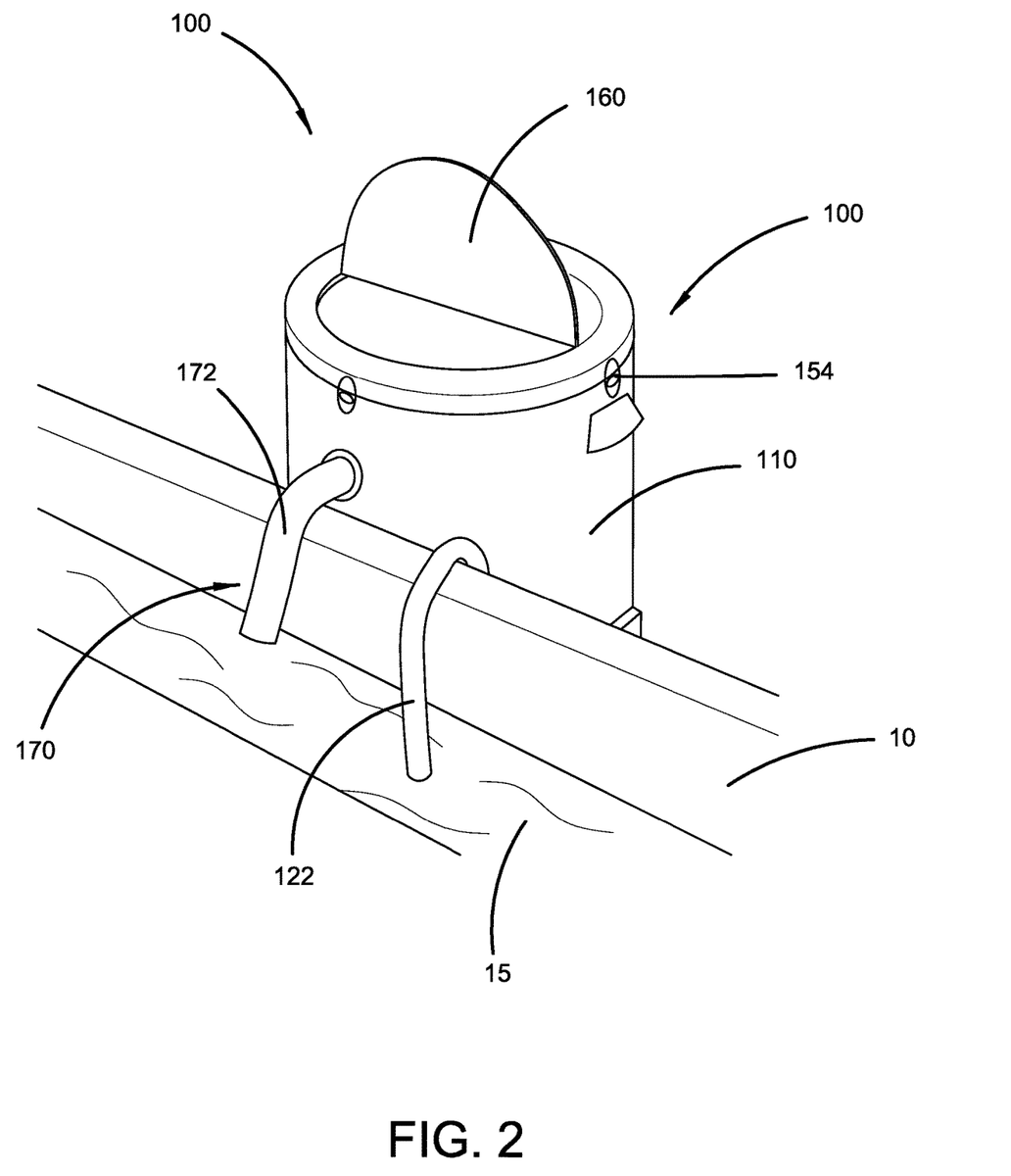
FIG. 2 illustrates a perspective view of one embodiment of the improved bait bucket of the present invention while placed inside a boating vessel on a body of water in accordance with the disclosed structure.

FIG. 2. illustrates a perspective view of one embodiment of the improved bait bucket or container 100 of the present invention while placed inside a boating vessel on a body of water or on a dock, pier, house boat or the like. In this figure, the function of both the suction hose assembly 120 and overflow hose assembly 170 will become fully apparent. Both hoses 122, 172 of the suction hose assembly 120 and overflow hose assembly 170 are preferably comprised of a reinforced PVC hose (e.g., wire, braided nylon, etc.), which in differing embodiments of the device 100, can also be comprised of a rubber material or other suitable material for transporting water. For example, it is contemplated that the overflow hose may be molded from a reinforced material and angled, and that the suction hose may be comprised of a reinforced heater hose. The suction hose may further comprise a priming bulb (not shown) along its length and a weighted end cap 1220 that will have, for example, three 2 oz tungsten weights integrated onto it (not shown). In addition, both hoses 122, 172 are removable for cleaning purposes. As noted in the figure, the suction hose assembly 120 may be placed over the side wall of a boat 10, for example into a body of water 15 to allow for the water 15 to be suctioned into the device 100 via a process that will be explained more fully below when discussing FIG. 3 and FIG. 4. The overflow hose assembly 170 also is preferably placed over the side wall of a boat 10 and over a body of water 15 to allow for old water, or water from inside the bucket or container to exit the device 100. The overflow hose assembly 170 is further comprised of an overflow fitting and cap (both not shown). The overflow fitting allows the assembly 170 to attach to the main body 110 of the device 100 and is further comprised of a threaded cap (not shown) that secures the assembly 170 to the main body 110. The fitting also includes a nylon or stainless steel mesh screen, which prevents bait fish from exiting the device via the assembly 170 but allows water, debris and other organic materials to exit the device 100. The cap with the mesh screen preferably attaches to the inside of the bucket at the overflow fitting.

Figure 3:
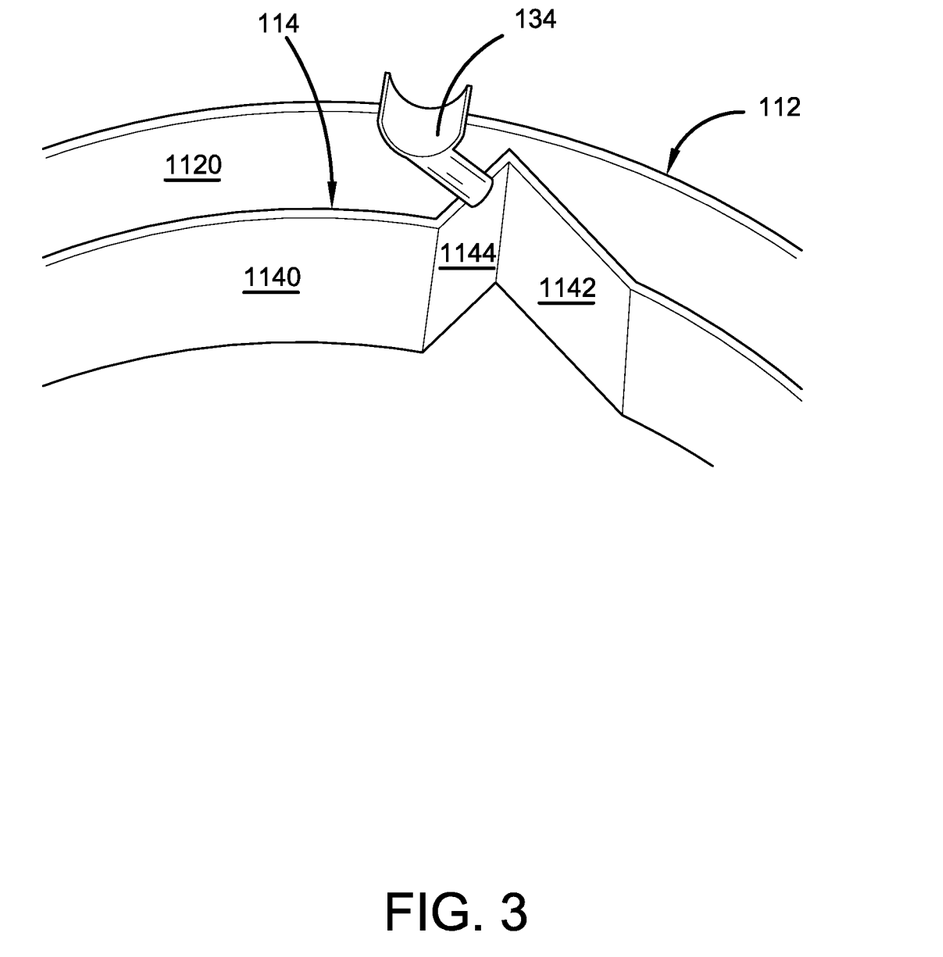
FIG. 3 illustrates a cross-sectional perspective view of the interior of the main body of one embodiment of the improved bait bucket of the present invention in accordance with the disclosed structure.

FIG. 3 illustrates a cross-sectional perspective view of the interior of the main body 110 of one embodiment of the improved bait bucket 100. It should be noted that the body 110 of the device 100 includes an exterior outer surface 112 and exterior inner surface 1120 as well as an interior outer surface 114 and interior inner surface 1140. It is preferred that within the device 100 a layer of foam insulation exists between the exterior inner surface 1120 and interior outer surface 114 to allow for the water stored within the device 100 to remain at a steady ambient or other desired temperature. It is also illustrated in this figure, that the inlet 134 of the water pump 130 can be fully observed. The inlet 134 travels from the pump 130 to the interior inner surface 1140 of the main body 110, wherein water exits the inlet 134 at the junction of the $1^{st}$ inlet wall 1142 and $2^{nd}$ inlet wall 1144, which meet in a generally triangular junction or shape. This shape encourages and enables a current to be formed within the main body 110 at all times, to which the bait fish will swim against and which in turn creates optimal dissolved oxygen levels and seeks to increase the lifespan and vitality of the baitfish. Importantly, the inlet 134 is a key feature on the bait bucket 100 and is preferably in the general shape of a pocket hole used in woodworking. Experimental testing has shown that optimal functionality of the bait bucket 100 can be achieved by angling the inlet 134 left or right but in the general direction of the bottom of the bucket and at an angle of 120 degrees (if angled to the right) or 240 degrees (if angled to the left) from the vertical. Notwithstanding, it is also contemplated that other angled positions could also be used with respect to the positioning of the inlet, such as between 60 degrees to 300 degrees from the vertical.

Figure 4:
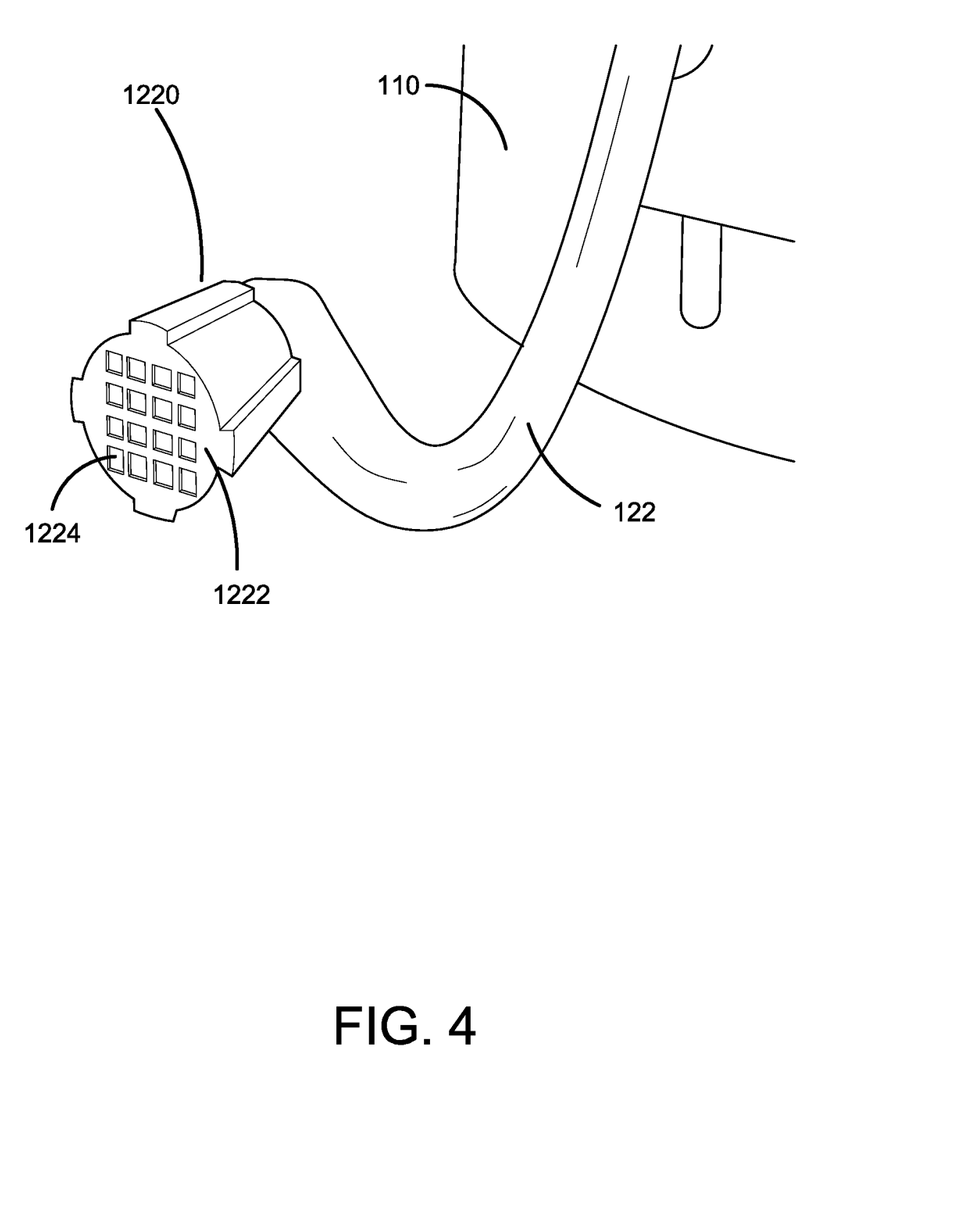
FIG. 4 illustrates a perspective view of one embodiment of the suction hose assembly of the improved bait bucket of the present invention in accordance with the disclosed structure.

FIG. 4 illustrates a perspective view of one embodiment of the suction hose assembly 120 of the improved bait bucket 100. The assembly 120 is further comprised of a hose 122 and an end cap 1220. As mentioned supra, the hose 122 is preferably comprised of a reinforced PVC hose (e.g., wire, braided nylon, etc.), which in differing embodiments of the device 100, can also be comprised of a rubber or other suitable material. The end cap 1220 of the device 100 is further comprised of a series of integrated weights (not shown) that allow the end cap 1220 to remain submerged under the surface of a body of water at all times, thereby ensuring a continuous supply of water is being suctioned into the device 100. The front surface 1222 of the end cap 1220 is further comprised of a grate 1224, or in differing embodiments of the device, a nylon or stainless steel mesh screen (not shown) which prevents large organic matter from entering into the device 100 via the suction hose assembly 120, while still allowing water to enter the assembly 120.

Figure 5:
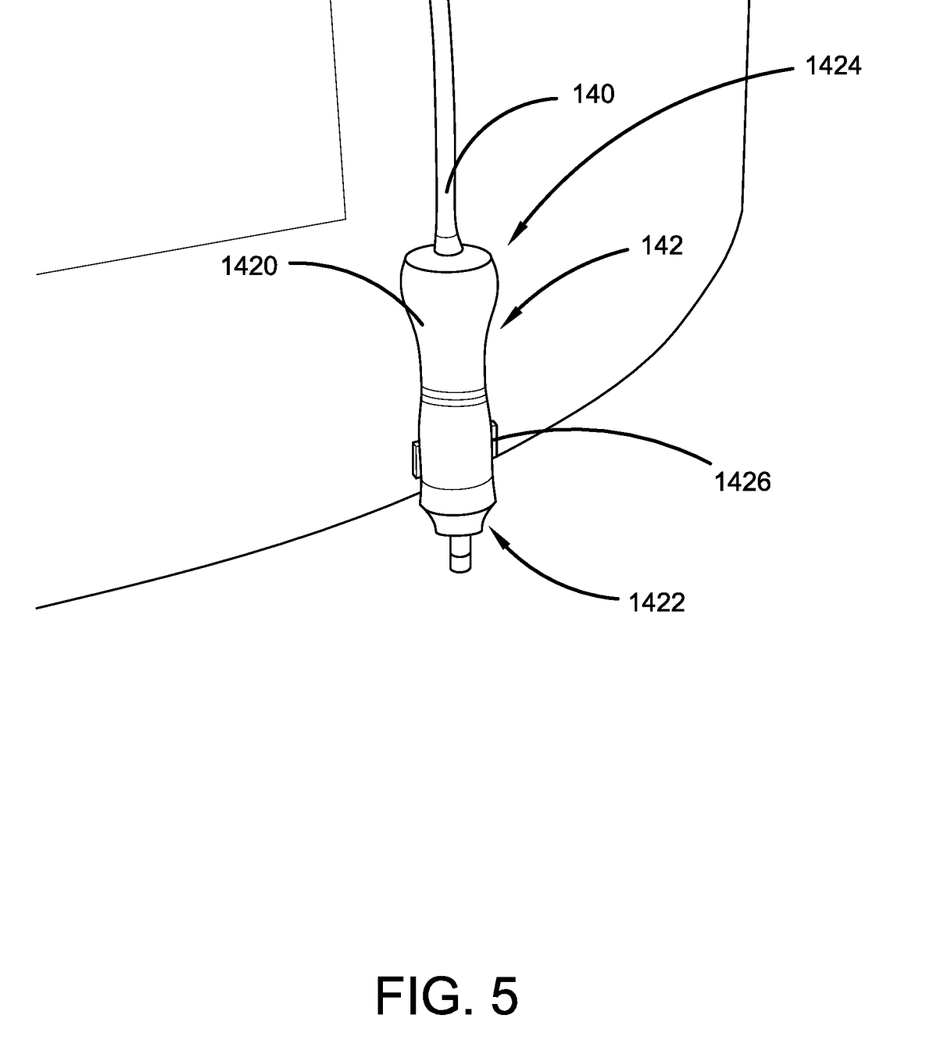
FIG. 5 illustrates a perspective view of the 12 v cigarette lighter plug power supply of one embodiment of the improved bait bucket of the present invention in accordance with the disclosed structure.

FIG. 5 illustrates a perspective view of the 12 v cigarette lighter plug 142, or other power adaptor and power supply cord 140 of one embodiment of the improved bait bucket 100. The plug 142 is further comprised of a plug body 1420, a $1^{st}$ end 1422, a second end 1424, and a pair of spring-loaded contacts 1426. The power supply cord 140 further enters the body 1420 at the $2^{nd}$ end 1424 and connects the plug 142 to the pump 130 to allow powering of the pump 130 to occur. The spring contacts 1426 that comprise the $1^{st}$ end 1422 of the plug 142 allow the plug 142 to be retained in a female cigarette lighter outlet. The outlets can be found in an automobile, ATV, motorhome, trailer or watercraft such as a boat where the outlets allow the battery of the device 100 to be charged and powered.

Notwithstanding the forgoing, the improved bait bucket 100 can be any suitable size, shape, and configuration as is known in the art without affecting the overall concept of the invention, provided that it accomplishes the above stated objectives. One of ordinary skill in the art will appreciate that the shape and size of the device 100 and its various components, as shown in the FIGS. are for illustrative purposes only, and that many other shapes and sizes of the device 100 are well within the scope of the present disclosure. Although dimensions of the device 100 and its components (i.e., length, width, and height) are important design parameters for good performance, the device 100 and may be any shape or size that ensures optimal performance during use and/or that suits user need and/or preference.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A bait bucket, comprising:
a container for holding a fluid and bait, the container having a lid and the lid having a main lid and a secondary portion movable perpendicularly to the main lid;
a pump comprising an inlet to the container, the pump secured in a housing adjacent the container;
a suction hose extending into the container and connected to the pump for drawing a fluid into the container; and
an outlet hose for drawing fluid from the container; and
wherein the container further comprises a body comprising an interior inner surface comprising a first inlet wall and a second inlet wall configured in a triangular shape at a location of the inlet of the pump.

2. The bait bucket of claim 1, wherein the container has no corners and has one of a circular, oval or elliptical shape.

3. The bait bucket of claim 1, wherein the pump includes a battery and the pump includes an adaptor to connect to an electrical outlet.

4. The bait bucket of claim 1, wherein the secondary portion has a dimension that is less than a dimension of the main lid.

5. A bait bucket, comprising:
a body having at least a partially cylindrical shape, the body having a perpendicularly extending lid portion;
a pump that is powered by a 12v power source separate from the body and the pump; the pump includes a battery and an inlet to the container;
a suction hose and an outlet hose, the suction hose connected to the pump and the outlet hose connected to the body; and
a main lid connected by a hinge to the perpendicularly extending lid portion and the main lid including closure element to secure the main lid to the body; and
wherein the body further comprises an interior inner surface comprising a first inlet wall and a second inlet wall configured in a triangular shape at a location of the inlet of the pump.

6. The bait bucket of claim 5, wherein the suction hose and outlet hose allow fluid to be continuously cycled throughout the body to create a current.

7. The bait bucket of claim 5, wherein the suction hose and the outlet hose are removable.

8. The bait bucket of claim 5, wherein the pump includes a power switch and the pump is contained in a housing separate from the body.

9. A bait bucket, comprising:
an insulated cylindrical body with at least one handle integrated with the body;
a pump comprising an inlet to the container, wherein the pump is powered by a 12v power source, and is connectable to the power source via an adaptor;
a suction hose that is connected to the pump to draw fluid into the body;
an outlet hose that allows water to be discharged from the cylindrical body;
a circular main lid that is secured to the main body of the body via a one of latches, clamps or fasteners; and
a semi-circular secondary lid that is attached to the main lid via a hinge and the secondary lid being perpendicularly extendable from the main lid; and
wherein the insulated cylindrical body further comprises an interior inner surface comprising a first inlet wall and a second inlet wall configured in a triangular shape at a location of the inlet of the pump, and wherein the inlet is angled left or right at 120 degrees and slightly downward.

10. The bait bucket of claim 9, wherein each of the outlet hose and the suction hose is constructed of reinforced PVC.

11. The bait bucket of claim 9, wherein each of the outlet hose and the suction hose is rubber.

12. The bait bucket of claim 9, wherein the main lid of the body has a gasket that prevents the contents of the body from spilling.

13. The bait bucket of claim 9, wherein the suction hose has a weighted end to keep the suction hose submerged under the surface of the fluid.

14. The bait bucket of claim 9, wherein the outlet hose has a mesh screen over an end of the outlet hose that prevents bait fish from exiting the device.

15. The bait bucket of claim 9, wherein the pump includes a 12v adaptor.

16. The bait bucket of claim 9, wherein the pump includes a stop to prevent the flow of fluid into the body.

17. The bait bucket of claim 9, wherein the cylindrical body is selected from the shape including circular, round, oval or elliptical.

18. The bait bucket of claim 9, wherein the body has no corners.

19. The bait bucket of claim 9, wherein the secondary lid allows access to at least a portion of the contents of the body without requiring the opening of the main lid.

* * * * *